428-408
SR
11/6/79 XR 4,173,677

United States Patent [19]
Nakano et al.
[11] 4,173,677
[45] Nov. 6, 1979

[54] ELECTRO-THERMOSENSITIVE RECORDING MATERIALS

[75] Inventors: Shiro Nakano, Suita; Masahiro Hotta, Osaka, both of Japan

[73] Assignee: Sekisui Kagaku Kogyo Kabushiki Kaisha, Osaka, Japan

[21] Appl. No.: 807,724

[22] Filed: Jun. 17, 1977

[30] Foreign Application Priority Data

Jun. 21, 1976 [JP] Japan ................................ 51/73488
May 10, 1977 [JP] Japan ................................ 52/53899

[51] Int. Cl.[2] ........................ B41M 5/18; B41M 5/20; B32B 27/30

[52] U.S. Cl. .................................... 428/335; 427/145; 427/148; 427/150; 427/151; 428/457; 428/522; 428/913; 428/408; 428/336; 428/463

[58] Field of Search ............... 427/148, 145, 150, 151, 427/144; 428/411, 408, 539, 510, 518, 520, 522, 913, 457, 335, 336, 463

[56] References Cited

U.S. PATENT DOCUMENTS

| | | | |
|---|---|---|---|
| Re. 29,427 | 10/1977 | Sekine | 427/145 |
| B 457,547 | 2/1976 | Laridon et al. | 427/148 |
| 3,479,953 | 11/1969 | Ritzerfeld | 427/148 X |
| 3,482,513 | 12/1969 | Michalchik et al. | 427/148 X |
| 3,864,684 | 2/1975 | Shimuzu | 427/145 |
| 3,871,972 | 3/1975 | Sekine | 427/150 X |
| 3,911,171 | 10/1975 | Janssens et al. | 427/148 |
| 3,924,041 | 12/1975 | Miyayama et al. | 427/148 X |
| 3,997,343 | 12/1976 | Weigl et al. | 428/539 X |

*Primary Examiner*—Harold Ansher
*Attorney, Agent, or Firm*—Wenderoth, Lind & Ponack

[57] ABSTRACT

An electro-thermosensitive recording material comprising (1) a support at least the surface of which is electrically conductive, and (2) a conductive recording layer formed on the conductive surface of the support, the recording layer containing (a) a film-forming chlorine-containing polymer and (b) dispersed in the polymer, an acid-sensitive leuco dye and at least one zinc compound selected from the group consisting of zinc oxide optionally doped with a different metal, zinc hydroxide, zinc sulfide, zinc carbonate, zinc acrylate and zinc stearate.

17 Claims, No Drawings

ELECTRO-THERMOSENSITIVE RECORDING MATERIALS

This invention relates to an electro-thermosensitive recording material, and more specifically, to an electro-thermosensitive recording material having a conductive recording layer consisting of a combination of an acid-sensitive leuco dye and a color-forming assistant composed of a film-forming chlorine-containing polymer and a zinc compound, which recording material does not form a color upon the application of pressure, has high color-forming sensitivity, and affords a recorded image that has a high contrast and clearness.

With abounding information in recent years, there has been an increased need for rapid transmission, recording, etc. of information. Various developments have been achieved in regard to information control systems such as information processing systems, information transmitting systems and information recording systems, and a facsimile system is a typical example.

The facsimile system converts an image into an electrical signal, transmits the electrical signal to a remote locality, converting the electrical signal back to the image there, and records it on a record sheet. Various electro-thermosensitive recording materials have been suggested as suitable for use in this system, and some have already come into practical use.

According to the recording system using the "electro-thermosensitive recording material", electrical signals given to the record layer of the recording material according to an image to be recorded are locally converted to heat, and the generated heat causes a thermosensitive color-forming agent present in the record layer to generate a color.

Japanese Patent Publication No. 33744/76 (published Sept. 21, 1976) discloses an electro-thermosensitive recording sheet containing cuprous iodide as a conductive agent which is adapted to form an image utilizing a color reaction between a leuco dye and a phenolic compound or an organic acid. Japanese Patent Publication No. 33417/76, on the other hand, discloses a record sheet containing an electrolyte as a conducting agent which upon passing an electric current therethrough, forms a color by a color reaction between a long-chain fatty acid metal salt and an organic reducing agent. In recording materials of this kind heretofore suggested, two kinds of thermosensitive color-forming components should be uniformly distributed while they are kept away from each other using a binder resin. Thus, the manufacturing process requires special measures for preventing the two color-forming components from reacting with each other, for example by dispersing the two components separately. Furthermore, since the record sheets contain components which undergo a color reaction in a normal condition if contacted with each other, these recording sheets have the defect that colors will form even at room temperature if their surfaces are rubbed, or scratched by a pointed instrument. Special care should therefore be taken to store these unused record sheets and the recorded sheets.

It is an object of this invention to provide an electro-thermosensitive recording material which is free from the defects associated with the conventional electro-thermosensitive recording materials described hereinabove.

Another object of this invention is to provide an electro-thermosensitive recording material which does not form a color upon the application of impact, rubbing or pressure, is easy to handle, and develops a color only when an electric current is passed through it.

Still another object of this invention is to provide an electro-thermosensitive recording material having a recording layer which has a small thickness and a high mechanical strength.

Other objects and advantages of this invention will become apparent from the following description.

According to the present invention, there is provided an electro-thermosensitive recording material comprising (1) a support at least the surface of which is electrically conductive, and (2) a conductive recording layer formed on the conductive surface of the support, the recording layer containing (a) a film-forming chlorine-containing polymer and (b) dispersed in the polymer, an acid-sensitive leuco dye and at least one zinc compound selected from the group consisting of zinc oxide optionally doped with a different metal, zinc hydroxide, zinc sulfide, zinc carbonate, zinc acrylate and zinc stearate.

The support or substrate for the electro-thermosensitive recording layer used in this invention is a material having conductivity at least at its surface. The measure for the conductivity is surface specific electrical resistance. The surface of the support used in this invention has a surface specific electrical resistance of not more than $10^5$ ohms, preferably not more than $10^4$ ohms, more preferably not more than $10^3$ ohms. Preferably, the surface specific electrical resistance of the support is at least 1/10 lower than the penetration electrical resistance of the record layer to be described.

Useful materials for the support are conductive materials, or electrically insulating materials the surfaces of which are treated to render them conductive. Examples of the conductive materials include metals such as copper, aluminum, or zinc, electrically conductive substances such as carbon black or metal powder, hygroscopic substances such as magnesium chloride or glycerol, and conductive synthetic resin compositions incorporated with ion-conducting substances such as surface active agents or polymeric electrolytes.

Examples of the electrically insulating materials whose surfaces have been rendered conductive are electrically insulating materials such as synthetic resins, paper, glass, and woven or nonwoven fabrics to the surface of which a thin layer of metal has been applied by such means as vacuum-deposition, plating, or bonding, or materials obtained by coating or laminating the above conductive synthetic resin composition onto the surfaces of the electrically insulating materials.

Usually, the support is in the form of a film, sheet or plate, and its thickness can be varied over a wide range according to the use of the recording material. For practical purposes, the suitable thickness is 20 to 300 microns, preferably 50 to 100 microns.

The recording layer in accordance with this invention is provided on the conductive surface of the support.

The recording layer is conductive and contains a film-forming chlorine-containing polymer and, dispersed therein, an acid-sensitive leuco dye and at least one zinc compound selected from the group consisting of zinc oxide optionally doped with a different metal, zinc hydroxide, zinc sulfide, zinc carbonate, zinc acrylate and zinc stearate.

The chlorine-containing polymer used in this invention is characterized in that it acts not only as a binder for the color-forming agent, but also as a colorforming assistant.

The chlorine-containing polymer used in this invention is film-forming, and advantageously one which readily generates hydrogen chloride upon heat decomposition. Hence, the chlorine-containing polymer desirably has a relatively low degree of polymerization. It is preferred, but not critical, that the chlorine-containing polymer have a degree of polymerization of not more than 800. The lower limit of the degree of polymerization is not critical, and so long as the polymer is film-forming, it is of the lowest possible degree of polymerization. Usually, the degree of polymerization is at least 200, and polymers with a degree of polymerization of about 400 to about 600 are suitable. Chlorine-containing polymers having high degrees of branching can be more advantageously used than those having low degrees of branching if both have substantially the same degrees of polymerization.

The chlorine-containing polymer contains a plurality of chlorine atoms bonded to the main chain or side chains of the polymer. Its chlorine content varies according, for example, to the type or degree of polymerization of the polymer. Generally, the polymer has a chlorine content of at least 30% by weight, preferably 35 to 85% by weight. The "chlorine content" denotes the weight percent of the chlorine component in a polymer.

Examples of the chlorine-containing polymer used in this invention include polyvinyl chloride, copolymers of vinyl chloride with comonomers, polyvinylidene chloride, copolymers of vinylidene chloride with comonomers, chlorinated polyolefins such as chlorinated polyethylene or chlorinated polypropylene, and rubber chloride.

The comonomers copolymerizable with vinyl chloride or vinylidene chloride are organic compounds containing at least one ethylenically unsaturated bond, for example vinyl esters of carboxylic acids such as vinyl acetate or vinyl stearate, olefins such as ethylene or propylene, vinyl compounds such as acrylonitrile or lauryl vinyl ether, unsaturated carboxylic acid esters such as methyl acrylate, butyl acrylate, octyl acrylate, methyl methacrylate, ethyl methacrylate, or dibutyl maleate, and unsaturated dicarboxylic acid anhydrides such as maleic anhydride. These comonomers can be used either alone or in admixture of two or more. The comonomers can be present as a minor component in the polymer, preferably in an amount of not more than 30 mole%, preferably not more than 15 mole%.

Specific examples of the copolymers of vinyl chloride or vinylidene chloride include a vinyl chloride/ethylene copolymer, a vinyl chloride/propylene copolymer, a vinyl chloride/vinyl acetate copolymer, a vinyl chloride/acrylonitrile copolymer, a vinyl chloride/vinyl stearate copolymer, a vinyl chloride/methyl acrylate copolymer, a vinyl chloride/butyl acrylate copolymer, a vinyl chloride/octyl acrylate copolymer, a vinyl chloride/dibutyl maleate copolymer, a vinyl chloride/lauryl vinyl ether copolymer, a vinyl chloride/vinyl acetate/-maleic anhydride copolymer, and a vinylidene chloride/acrylonitrile copolymer.

A copolymer of vinyl chloride and vinylidene chloride can also be used in the present invention with the molar ratio of the two being variable as desired.

The above-mentioned chlorine-containing polymers may be used alone, or as mixtures of these with one another, or as blends of these with other compatible polymers. When a blend of the chlorine-containing polymer with another compatible polymer is used, the amount of the chlorine-containing polymer in the blend is at least 60% by weight, preferably at least 80% by weight, based on the weight of the blend.

Preferred chlorine-containing polymers that can be suitably used in this invention are polyvinyl chloride, polyvinylidene chloride, and copolymers of vinyl chloride or vinylidene chloride with comonomers. Of these, the copolymers of vinyl chloride such as a vinyl chloride/vinyl acetate copolymer, a vinyl chloride/ethylene copolymer, and a vinyl chloride/vinyl acetate/maleic anhydride copolymer, are especially advantageous.

The "acid-sensitive leuco dye" dispersible in the chlorine-containing polymeric material used in this invention denotes a colorless or pale-colored chromogenic compound which is, for example, obtained by reducing a colored compound, and forms a color upon contact with an acid compound such as phenol, cresol, hydrochloric acid or acetic acid. In the present invention, leuco dyes of the triphenylmethane, fluorane, phenothiazine, auramine and spiropyran types are especially advantageously used.

Typical examples of suitable acid-sensitive leuco dyes are listed below. However, the leuco dyes usable in the present invention are not limited to these species, and those skilled in the art would be able to use other acid-sensitive leuco dyes without departing from the objects and spirit of the present invention.

They are leuco forms of triphenylmethane-type dyes such as malachite green leuco base, malachite green leuco carbinol, malachite green leuco nitrile, malachite green leuco sulfonyl, crystal violet leuco carbinol, victoria blue leuco carbinol, aniline blue leuco carbinol, methyl violet leuco carbinol and para-rose aniline leuco carbinol; phthalide compounds of triphenylmethane-type dyes such as malachite green lactone, crystal violet lactone and methyl violet lactone; leuco forms of fluorane dyes such as rhodamine B lactone, rhodamine B lactam, and 3-diethylamino-7-cyclohexylaminofluorane; and leuco forms of phenothiazine-type dyes such as leuco methylene blue, and benzoyl leuco methylene blue. Of these leuco dyes, malachite green leuco nitrile, malachite green lactone, crystal violet lactone, rhodamine B lactone, leuco methylene blue, and benzoyl leuco methylene blue are especially preferred.

Depending upon the desired color, these acid-sensitive leuco dyes are used either alone or in admixture of two or more. The amount of the leuco dye is not particularly limited, and may be determined according to the required density of the image at the time of recording. Generally, the amount is at least 1.0 parts by weight per 100 parts by weight of the chlorine-containing polymer. The upper limit of the amount is not critical, and can be varied widely according to the density of the image desired after color formation of the recording material. Usually, the amount of the leuco dye is not more than 500 parts by weight, preferably 2.0 to 300 parts by weight, more preferably 20 to 150 parts by weight, per 100 parts by weight of the chlorine-containing polymer.

The zinc compound to be dispersed in the chlorine-containing polymer together with the leuco dye promotes the dehydrochlorinating decomposition of the chlorine-containing polymer at the time of heating, and reacts with hydrogen chloride to form zinc chloride which then contacts the acid-sensitive leuco dye to promote the rapid color-formation of the leuco dye.

It has been found that the zinc compound selected from the group consisting of zinc oxide optionally doped with a different metal, zinc hydroxide, zinc sulfide, zinc carbonate, zinc acrylate and zinc stearate is especially suitable. These zinc compounds can be dispersed in the chlorine-containing polymer either alone or in admixture of two or more.

Of these zinc compounds, zinc oxide optionally doped with a different metal and zinc stearate are especially suitable from the standpoint of color-forming sensitivity and other properties. The doped zinc oxide is most suitable in this invention since it has high surface activity, is electrically conductive, and acts both as a color-forming assistant and as a conductivity-imparting agent for the record layer.

Preferably, the metal capable of doping zinc oxide is a metal of Groups III, IV, V and VIII of the periodic table, specifically aluminum, titanium, gallium, germanium, indium, tin, antimony, and iron. Of these, aluminum, indium, gallium, and germanium are especially preferred.

Desirably, the doped zinc oxide has semi-conductivity and can also serve as a conductivity-imparting agent. Hence, the doped zinc oxide preferably has as low a resistance as possible, and advantageously a specific resistance, as measured by a powder compressing method (JIS K-1469, Japanese Industrial Standards), of not more than $10^6$ ohms-cm, preferably not more than $10^2$ ohms-cm (when measured at a compression strength of 400 kg/cm$^2$).

The amount of the metal used to dope the zinc oxide can be varied widely according, for example, to the type of the metal or the degree of conductivity required of the doped zinc oxide. Generally, the amount is 0.01 to 5% by weight, preferably 0.03 to 2.0% by weight, more preferably 0.05 to 1.5% by weight, based on the weight of zinc oxide.

Doping of zinc oxide with the different metal can be performed by various known methods, for example those described in U.S. Pat. Nos. 3,538,022 and 3,538,023. For example, zinc oxide doped with a different metal can be obtained by burning a zinc oxide powder and an oxide of the metal at 600° to 1,400° C. in an atmosphere of an inert gas such as nitrogen or argon or a reducing gas such as hydrogen or carbon monoxide.

The amount of the zinc compound to be mixed with the chlorine-containing polymer can be varied over a wide range according, for example, to the type of the zinc compound and the type of the polymer, but is desirably at least 0.1 part by weight per 100 parts by weight of the chlorine-containing polymer. The upper limit of the amount is 1,500 parts by weight for economic reasons and for maintaining the mechanical strength of the recording layer. The suitable amount is 1.0 to 1,200 parts by weight, preferably 2.0 to 1,000 parts by weight, per 100 parts by weight of the chlorine-containing polymer. When the zinc compound is used in combination with the conductivity-imparting agent for rendering the recording layer conductive, the amount of the zinc compound required is relatively small within the above range, for example 0.1 to 600 parts by weight, preferably 2.0 to 300 parts by weight, per 100 parts by weight of the chlorine-containing polymer. On the other hand, when the doped zinc oxide is used in order to cause it to serve not only as a color-forming assistant but also as an agent to render the recording layer electrically conductive, its amount is conveniently 200 to 1,200 parts by weight, preferably 200 to 800 parts by weight, per 100 parts by weight of the chlorine-containing polymer.

The chlorine-containing polymer, acid-sensitive leuco dye and zinc compound are mixed together to form a composition which is used as the recording layer of the recording material of this invention.

The recording layer must have conductivity, and the degree of conductivity can be defined by the penetration electrical resistance of the recording layer in its thickness direction. Generally, it is preferred that the recording layer of the material of this invention have a penetration electrical resistance of not more than $10^6$ ohms, preferably not more than $10^5$ ohms, more preferably $2\times10^2$ to $5\times10^4$ ohms.

When the penetration electrical resistance of the recording layer composed of the composition consisting essentially of the chlorine-containing polymer, the acid-sensitive leuco dye and the zinc compound is outside the above-specified range or when a lower penetration electrical resistance within the above-specified range is desired, the composition for forming the recording layer may be treated with a conductivity-imparting agent.

The conductivity-imparting agent has the ability to reduce the resistance of the composition for forming the recording layer, namely to increase its conductivity. The type of the conductivity-imparting agent is not restricted in particular so long as it is inert to the acid-sensitive leuco dye and does not cause the dye to form a color upon contact. Examples of the conductivity-imparting agent are powders of metals such as copper, aluminum or zinc; conductive metal compounds such as cuprous iodide or stannic oxide; and compounds which impart ion conductivity to the composition, for example inorganic electrolytes such as lithium chloride, sodium chloride or potassium chloride, surface active agents, and polymeric electrolytes such as polyvinyl benzyl trimethyl ammonium chloride or oligostyrenesulfonic acid salts. These substances can be incorporated in the composition either alone or as admixtures of two or more.

The doped zinc oxide exemplified as a zinc compound has superior conductivity, and can be used conveniently as the conductivity-imparting agent either alone or in combination with another of the zinc compounds described above. Thus, when the doped zinc oxide is employed as the zinc compound, the use of the conductivity-imparting agent described can be omitted. In this case, the doped zinc oxide can be used in an amount of usually 200 to 1,200 parts by weight, and advantageously 200 to 800 parts by weight, per 100 parts by weight of the chlorine-containing polymer.

The amount of the conductivity-imparting agent to be incorporated varies greatly according to the type of the agent, etc., and cannot be definitely determined here. The amount is, in short, such that a recording layer prepared from the composition containing the conductivity-imparting agent has a penetration electrical resistance of not more than $10^6$ ohms, preferably not more than $10^5$ ohms.

In order to improve the storage stability of the recording material, the recording layer in accordance with this invention may be incorporated with a certain kind of electron donor compound. The electron donor compound is a compound which has the ability to donate electrons, is inert to the acid-sensitive leuco dye and does not substantially form a color even upon contact with an acid substance. Examples of suitable electron donor compounds for use in this invention are organic quaternary ammonium salts such as an alkyltrimethyl ammonium chloride, amines such as dodecylamine, didodecylamine or triethanolamine; pyridinium salts such as an alkyl pyridinium chloride; heterocyclic compounds such as an alkyloxazoline; condensed ring aromatic hydrocarbons such as pyrene; and polyhydric alcohols such as glycerol, polyethylene glycol or hexanediol. Of these, compounds having a boiling point of at least 150° C. are preferred.

The amount of the electron donor compound is at least 0.05 parts by weight, preferably 0.1 to 50 parts by weight, more preferably 1.0 to 30 parts by weight, per 100 parts by weight of the chlorine-containing polymer.

The recording layer in accordance with this invention may also be incorporated with a finely divided filler which is inert to the acid-sensitive leuco dyes, in order, for example, to adjust the color-forming sensitivity of the leuco dye, render the appearance of the recording material natural, increase the whiteness of the record layer, improve the coatability of the recording layer-forming composition on the support, prevent the adhesion of the resin constituting the recording layer to a recording stylus at the time of recording images, and to control the contrast of the images. The filler denotes a fine powdery solid which has substantially no ability to donate protons or accept electrons, and therefore does not participate in the color-forming reaction of the leuco dye. It quite differs in the purpose of use from solid acids which are frequently used as color-forming assistants for leuco dyes in producing carbonless pressure-sensitive sheets.

Examples of finely divided fillers that can be used in this invention are calcium oxide, magnesium oxide, sodium carbonate, potassium carbonate, strontium carbonate, titanium oxide, barium sulfate, lithopone, basic magnesium carbonate, basic lead carbonate, basic lead sulfate, basic lead silicate, calcium carbonate, white carbon, silica, kaolin clay, and talc. Solid powders which are inherently acidic, such as solid acids, may be used as needed if they have been rendered inert to the acid-sensitive leuco dyes by treatment with basic substances.

Advantageously, the fine powdery filler is used in an amount of at least 10 parts by weight, preferably 50 to 600 parts by weight, more preferably 100 to 400 parts by weight, per 100 parts by weight of the chlorine-containing polymer.

The recording layer may, if desired, contain an effective amount of a plasticizer such as dioctyl phthalate or dibutyl phthalate in order to increase the flexibility of the recording layer, or prevent the curling of the record sheet.

The recording layer in accordance with the invention can be applied to a support having a conductive surface by any method known in the art. For example, the ingredients which are to constitute the recording layer are dissolved or dispersed uniformly in a solvent, and the solution or dispersion is coated or cast onto the surface and then dried. The solvent used at this time is advantageously a solvent capable of dissolving the chlorine-containing polymer such as cyclohexanone, tetrahydrofuran, dichloroethane, tetrachloroethane, chlorobenzene, or dimethylformamide.

The thickness of the resulting recording layer is not critical, and can be varied widely according to the use of the recording material, etc., and is generally on the order of several microns to several tens of microns. For practical applications, the thickness of the recording layer is 5 to 50 microns, advantageously 5 to 20 microns.

The recording materials furnished by the present invention can be used in combination with ordinary electrothermosensitive recording apparatus, such as NATIONAL PANAFAX 1000 and NATIONAL PANAFAX 3000 (trademarks for products of Matsushita Denso Kiki Kabushiki Kaisha), and also with known discharge recording apparatus such as NATIONAL PANAFAX 1000 D (trademark for a product of Matsushita Denso Kiki Kabushiki Kaisha), NEFAS 1000 (trademark for a product of Nippon Denki Kabushiki Kaisha), or DEX 621 (trademark for a product of Dex Company).

The recording material of this invention may be said to be a sheet-like resistor having thermosensitive color-formability. When the recording material is supplied to the electro-thermosensitive recording apparatus, a recording stylus and a counter electrode are contacted with the surface of the recording layer, and an electric signal is applied across the two electrodes, a current corresponding to the signal flows from the recording stylus to a portion immediately below the recording stylus and toward the surface of the support perpendicularly in the thickness direction. The current then reaches a portion immediately below the counter electrode, and again via the recording layer, reaches the counter electrode which is in contact with the surface of the recording layer, thereby to form an electrically closed circuit. The current supplied is converted to Joule's heat in the recording layer immediately before the recording stylus according to the electric resistivity of the recording layer. By the Joule's heat, the chlorine-containing polymer acts on the zinc compound to locally form an acidic atmosphere required for the color formation of the acid-sensitive leuco dye. The leuco dye which contacts the acidic atmosphere immediately generates a color inherent to it. Thus, only those portions to which a current has been supplied from the recording stylus change in color and are rendered visible.

As stated, the electro-thermosensitive recording material of this invention consists of a support and a recording layer formed thereon, the record layer comprising a conductive composition composed of the chlorine-containing polymer, the zinc compound and the acid-sensitive leuco dye. When it is heated, the chlorine-containing polymeric material and the zinc compound react each other and act as a color-forming assistant for the leuco dye. It is unnecessary therefore to include such a color-forming assistant as an organic acid or a phenolic compound separately in the recording layer, and the color-forming action of the leuco dye can be induced by the chlorine-containing polymer which constitutes the recording layer. Hence, the record layer contains the individual constituent components uniformly dispersed therein, and the thickness of the recording layer can be decreased.

Furthermore, other conventional color-forming assistants need not be used, and it is only when the recording material is heated that the chlorine-containing polymeric material and the zinc compound act as color-forming assistants. Hence, even when the recording material undergoes impact or pressure, the leuco dye does not undergo a color reaction. In other words, since the recording material of this invention does not form a color under pressure, it is not necessary to take the trouble of avoiding the application of impact or pressure during heating.

When zinc oxide doped with a different metal is used as the zinc compound, the amount of the conductivity-imparting agent can be decreased or no conductivity-imparting agent is necessary, because the doped zinc oxide is conductive. Hence, the thickness of the recording layer can be decreased correspondingly, and the content of the chlorine-containing polymer of the recording layer increases. This results in an increase in the mechanical strength of the recording layer.

Furthermore, as stated, the chlorine-containing polymer and the zinc compound react with each other by the Joule's heat generated by an electric current passed through the recording layer, and thus act as a superior color-forming assistant for the acid-sensitive leuco dyes. This improves the color-forming sensitivity of the recording material, and an image of clear contrast can be obtained. The use of zinc oxide doped with a different metal, because of its high surface activity and its excellent sensitivity to heat, improves the color-forming sensitivity of the recording material, and gives an image having a clear contrast. Furthermore, since the doped zinc oxide is conductive, the amount of the conductivity-imparting agent such as a metal powder or cuprous iodide can be decreased, or no conductivity-imparting agent is necessary. Consequently, the whiteness of the recording layer can be increased, and a paper-like natural appearance can be imparted to the recording material. This leads to an image of clearer contrast.

The recording material of this invention can be used conveniently as an electro-thermosensitive recording material in various applications such as terminal recording devices in electronic computers, automatic recording devices of automatic measuring apparatus, and various printers.

The following Examples further illustrate the present invention.

All parts in the Example are by weight unless otherwise specified. The degree of polymerization was measured in accordance with JIS K-6721 (Japanese Industrial Standards relating to Method for Testing Vinyl Chloride Resins).

EXAMPLE 1

| Formulation | |
|---|---|
| Polyvinyl butyral | 100 parts |
| Carbon black | 50 parts |
| Ethyl alcohol | 1800 parts |

The ingredients in the above formulation were mixed and dispersed by a three roll mill to form a coating composition for preparing a conductive layer. The coating composition was coated on a sheet of high quality paper having a thickness of 80 microns by a roll coater to a dry thickness of 10 microns, and dried to form a conductive substrate.

The ingredients in the following formulation were mixed and dispersed by a homomixer for 10 minutes to form a coating composition for forming a recording layer.

| Formulation | |
|---|---|
| Polyvinyl chloride (degree of polymerization 750) | 100 parts |
| Zinc oxide | 100 parts |

-continued

| Formulation | |
|---|---|
| Crystal violet lactone | 15 parts |
| Benzoyl leuco methylene blue | 5 parts |
| Cuprous iodide | 800 parts |
| Tetrahydrofuran | 1500 parts |

The coating composition was coated on the conductive base to a dry thickness of 15 microns, and dried to form a recording material. The recording material was white because the recording layer hid the black color of the conductive layer.

The recording material was mounted on a portable facsimile receiver-transmitter (NATIONAL PANAFAX 1000), and scanned at 3.78 lines/mm. A clear deep navy blue image having a reflective optical density of 0.82 was obtained. The resulting image had good reproducibility of halftones such as in photograph. The storage stability of the image was good.

EXAMPLE 2

| Formulation | |
|---|---|
| Vinyl chloride ethylene copolymer (degree of polymerization 800; ethylene content 4% by weight) | 100 parts |
| Zinc stearate 5 parts | |
| Rhodamine B lactam | 20 parts |
| Stannic oxide | 1000 parts |
| Tetrahydrofuran | 1500 parts |

The ingredients in the above formulation were mixed and dispersed for 10 minutes by a homomixer to form a coating composition for forming a recording layer. The coating composition was coated by a wire bar to a dry thickness of 15 microns on a conductive substrate which had been obtained by vacuum-depositing aluminum to a thickness of 300 Å on a polyethylene terephthalate film. The coating was then dried to form a recording material. The recording material was slightly pinkish white, and the color did not change with time.

The recording material obtained was supplied to a commercially available process machine for an electronic stencil and scanned to 13 lines/mm while adjusting the speed of the drum to 300 rpm and the pressure of the recording stylus at 10 g. A deep red clear image was recorded. The resolution power of the recorded image was such that in a facsimile test chart, types of up to 5 points could be clearly viewed. The image had a reflective optical density of 1.0.

EXAMPLE 3

| Formulation | |
|---|---|
| Vinyl chloride/vinyl acetate copolymer (degree of polyymerization 500; vinyl acetate content 6.5% by weight) | 100 parts |
| Zinc oxide | 100 parts |
| Malachite green leuco nitrile | 5 parts |
| Malachite green lactone | 15 parts |
| Cuprous iodide | 1000 parts |
| Dodecyl trimethyl ammonium chloride (30% aqueous solution) | 10 parts |
| Tetrahydrofuran | 1500 parts |

The ingredients in the above formulation were mixed in the same manner as in Example 1 to afford a coating composition. The coating composition was coated on the same conductive substrate as used in Example 1, and then dried in the same manner as in Example 1 to afford a recording material.

When the recording material was processed in the same way as in Example 1, a green clear image was recorded.

EXAMPLE 4

| Formulation | |
|---|---|
| Polyvinyl chloride (degree of polymerization 500) | 100 parts |
| Zinc sterate | 5 parts |
| Leuco methylene blue | 10 parts |
| Crystal violet lactone | 15 parts |
| Cuprous iodide | 900 parts |
| Ethylene oxide alkyldiamine (ELECTROSTRIPPER-EA, (a trademark for a product of Kao-Atlas Co., Ltd.) | 10 parts |
| Titanium oxide | 50 parts |
| Tetrahydrofuran | 1500 parts |

A coating composition was prepared in the same manner as in Example 1 in accordance with the above formulation, and in the same manner as in Example 1, coated on the same conductive substrate as prepared in Example 1, and thus dried.

The resulting recording material was pure white because the recording layer hid the black color of the conductive layer. No change in color occurred with time.

When the recording material was processed in the same way as in Example 2, a deep navy blue clear image was recorded. The resolution power of the recorded image was such that types of up to 5 points could be viewed clearly. The recorded image has a reflective optical density of 1.1.

EXAMPLE 5

| Formulation | |
|---|---|
| Vinyl chloride/vinyl acetate copolymer (degree of polymerization 450; vinyl acetate content 6.5% by weight) | 100 parts |
| Zinc oxide | 50 parts |
| Benzoyl leuco methylene blue | 4 parts |
| Crystal violet lactone | 6 parts |
| Malachite green lactone | 6 parts |
| 3-Dimethylamino-6-methoxy-fluorane | 5 parts |
| Cuprous iodide | 1000 parts |
| Ethylene oxide alkyldiamine (ELECTROSTRIPPER-EA, a trademark for a product of Kao-Atlas Co., Ltd.) | 10 parts |
| Precipitated calcium carbonate | 30 parts |
| Tetrahydrofuran | 1500 parts |

A coating composition was prepared in accordance with the above formulation in the same way as in Example 1, and in the same way as in Example 1, coated on the same conductive substrate as used in Example 1, and dried to form a recording material.

The recording material had a reflective optical density of 0.15 to 0.20 at the background.

When the recording material was processed in the same way as in Example 1, an image having a nearly black color was recorded.

EXAMPLE 6

| Formulation | |
|---|---|
| Vinyl chloride/vinyl acetate copolymer (degree of polymerization 650; vinyl chloride content 87% by weight | 100 parts |
| Zinc oxide | 100 parts |
| Crystal violet lactone | 70 parts |
| Dodecyl trimethyl aluminum chloride (30% aqueous solution) | 10 parts |
| Cuprous iodide | 1000 parts |
| Tetrahydrofuran | 900 parts |

A coating composition was prepared in accordance with the above formulation in the same way as in Example 1. The coating composition was coated on a substrate (TOSHAFAX STENCIL SHEET, a trademark for a product of Tomoegawa Seishi Kabushiki Kaisha) having a surface specific resistance of $3.5\times10^3$ ohms to a dry thickness of 15 microns by means of a bar coater. The coating was dried at 120° C. for 2 minutes to form a recording material. The recording material was white, and had a reflective optical density of 0.30.

When the recording material was processed in the same way as in Example 1, a deep navy blue clear image was recorded. The resulting image had a reflective optical density of 0.95.

EXAMPLE 7

| Formulation | |
|---|---|
| Vinyl chloride/vinyl acetate copolymer (degree of polymerization 420; vinyl chloride content 87% by weight | 100 parts |
| Zinc oxide (doped with 0.8% by weight of indium | 300 parts |
| Zinc oxide | 300 parts |
| Crystal violet lactone | 70 parts |
| Dodecyl trimethyl ammonium chloride (30% aqueous solution | 8 parts |
| Ethyl acetate | 600 parts |
| Toluene | 300 parts |

The ingredients in the above formulation were mixed and dispersed for 20 minutes by a homomixer. The resulting coating composition was coated by a bar coater to a dry thickness of 15 microns on a substrate which had been obtained by vacuum-depositing aluminum to a thickness of 400 Å on a polyethylene terephthalate film, and then dried at 120° C. for 2 minutes to afford a recording material.

The recording material was white, and had a reflective optical density of 0.13. The whiteness of the recording material evidently increased over that of the recording material obtained in Example 6 which contained cuprous iodide as a conductivity-imparting agent.

When the resulting recording material was processed in the same way as in Example 1, a deep navy blue clear image was recorded. The resulting image had a reflective optical density of 1.16.

EXAMPLE 8

| Formulation | |
|---|---|
| Vinyl chloride/vinyl acetate | 50 parts |

-continued

| Formulation | |
|---|---|
| copolymer (degree of polymerization 650; vinyl chloride content 87%) | |
| Vinyl chloride/vinyl acetate/ maleic anhydride copolymer (degree of polymerization 420; vinyl chloride content 86% by weight; vinyl acetate content 13% by weight) | 50 parts |
| Zinc oxide (doped with 0.7% by weight of aluminum) | 600 parts |
| Zinc oxide | 100 parts |
| Crystal violet lactone | 70 parts |
| Hexadecyl trimethyl ammonium chloride (40% isopropyl alcohol solution) | 10 parts |
| Tetrahydrofuran | 900 parts |

The ingredients in the above formulation were mixed and dispersed in the same way as in Example 7. The resulting coating composition was coated on a substrate which had been obtained by vacuum-depositing aluminum to a thickness of 400 Å on a sheet of high quality paper. The coating was dried in the same way as in Example 1 to afford a recording material.

The recording material was white, and had a reflective optical density of 0.23. It was evident that the whiteness of the recording material was higher than that of the recording material obtained in Example 6 which contained cuprous iodide as a conductivity-imparting agent.

When the recording material was processed in the same way as in Example 1, a deep navy blue clear image was recorded. The recorded image had a reflective optical density of 1.10.

EXAMPLE 9

| Formulation | |
|---|---|
| Vinyl chloride/vinyl acetate copolymer (degree of polymerization 650; vinyl chloride content 87% by weight) | 50 parts |
| Vinyl chloride/vinyl acetate/ maleic anhydride copolymer (degree of polymerization 420; vinyl chloride content 86% by weight, vinyl acetate content 13% by weight | 50 parts |
| Zinc oxide (doped with 0.7% by weight of aluminum) | 600 parts |
| Crystal violet lactone | 70 parts |
| Dodecyl trimethyl ammonium chloride (30% aqueous solution) | 8 parts |
| Ethyl acetate | 600 parts |
| Toluene | 300 parts |

The ingredients in the above formulation were mixed and dispersed in the same way as in Example 7. In the same way as in Example 8, the resulting coating composition was coated on the same sheet of high quality paper as used in Example 8, and dried to afford a recording material. The recording material was white, and had a reflective optical density of 0.25.

When the resulting recording material was processed in the same way as in Example 1, a deep navy blue clear image was recorded. The recorded image had a reflective optical density of 1.10.

EXAMPLE 10

| Formulation | |
|---|---|
| Polyvinyl chloride (degree of polymerization 750) | 100 parts |
| Zinc sulfate | 100 parts |
| Crystal violet lactone | 20 parts |
| Cuprous iodide | 800 parts |
| Ethylene oxide dialkylamine | 10 parts |
| Tetrahydrofuran | 1000 parts |

A coating composition was prepared in the same way as in Example 1 in accordance with the above formulation, and coated on the same conductive substrate as used in Example 1, and dried to afford a recording material. The background of the recording material had a reflective optical density of 0.35.

When the recording material was processed in the same way as in Example 1, a blue image was recorded. The recorded image had a reflective optical density of 0.75.

EXAMPLE 11

| Formulation | |
|---|---|
| Vinyl chloride/vinyl acetate copolymer (degree of polymerization 650; vinyl chloride content 87% by weight) | 50 parts |
| Vinyl chloride/vinyl acetate/ maleic anhydride copolymer (degree of polymerization 420; vinyl chloride content 86% by weight; vinyl acetate content 13% by weight) | 50 parts |
| Zinc oxide (doped with about 0.7% by weight of antimony) | 600 parts |
| Crystal violet lactone | 70 parts |
| Dodecyl trimethyl ammonium chloride (30% aqueous solution) | 8 parts |
| Ethyl acetate | 600 parts |
| Toluene | 300 parts |

The ingredients in the above formulation were mixed and dispersed in the same way as in Example 7. The resulting coating composition was coated to a dry thickness of 10 microns by a bar coater on a substrate obtained by vacuum-deposition of aluminum to a thickness of 400 Å on a 75 micron-thick polyethylene terephthalate film. The coating was dried to form a recording material.

The background of the recording material had a reflective optical density of 0.10. When the recording material was processed in the same way as in Example 1, an image having a reflective optical density of 0.75 was recorded.

EXAMPLE 12

| Formulation | |
|---|---|
| Vinyl chloride/vinyl acetate copolymer (degree of polymerization 650; vinyl chloride content 87% by weight) | 50 parts |
| Vinyl chloride/vinyl acetate/ maleic anhydride copolymer (degree of polymerization 420; vinyl chloride content 86% by weight; vinyl acetate content 13% by weight) | 50 parts |

-continued

| Formulation | |
|---|---|
| Zinc oxide (doped with about 0.5% by weight of aluminum and about 0.2% by weight of iron) | 600 parts |
| Crystal violet lactone | 70 parts |
| Dodecyl trimethyl ammonium chloride (30% aqueous solution) | 8 parts |
| Ethyl acetate | 600 parts |
| Toluene | 300 parts |

The ingredients in the above formulation were mixed and dispersed, and coated on a substrate in the same way as in Example 11 to afford a recording material. The background of the recording material had a reflective optical density of 0.22.

When the recording material was processed in the same way as in Example 1, an image having a reflective optical density of 0.97 was recorded. What we claim is:

1. An electro-thermosensitive recording material comprising:

(1) a support at least the surface of which is electrically conductive, and (2) a conductive recording layer formed on the conductive surface of the support, said conductive recording layer containing (a) a film-forming polymer selected from the group consisting of polyvinyl chloride and copolymers of not less than 70 mol % of vinyl chloride, and (b) dispersed in the film-forming polymer, an acid-sensitive leuco dye and at least one zinc compound selected from the group consisting of zinc oxide, zinc hydroxide, zinc sulfide, zinc carbonate, zinc acrylate, zinc stearate and zinc oxide doped with a different metal selected from the group consisting of aluminum, titanium, gallium, germanium, indium, tin, antimony and iron.

2. The recording material of claim 1 wherein the film-forming polymer has a degree of polymerization of not more than 800.

3. The recording material of claim 1 wherein the acid-sensitive leuco dye is selected from the group consisting of leuco dyes of the triphenylmethane, fluorane, phenothiazine, auramine and spiropyran types.

4. The recording material of claim 1 wherein the acid-sensitive leuco dye is selected from the group consisting of malachite green leuco base, malachite green leuco carbinol, malachite green leuco nitrile, malachite green leuco sulfonyl, crystal violet leuco carbinol, victoria blue leuco carbinol, aniline blue leuco carbinol, methyl violet leuco carbinol, para-rose aniline leuco carbinol, malachite green lactone, crystal violet lactone, methyl violet lactone, rhodamine B lactone, rhodamine B lactam, 3-diethylamino-7-cyclohexylaminofluorane, leuco methylene blue and benzoyl leuco methylene blue.

5. The recording material of claim 1 wherein the amount of the acid-sensitive leuco dye is at least 1.0 part by weight per 100 parts by weight of the film-forming polymer.

6. The recording material of claim 1 wherein the amount of the acid-sensitive leuco dye is 2.0 to 300 parts by weight per 100 parts by weight of the film-forming polymer.

7. The recording material of claim 1 wherein the amount of the zinc compound is at least 0.1 part per 100 parts by weight of the film-forming polymer.

8. The recording material of claim 1 wherein the amount of the zinc compound is 1.0 to 1,200 parts by weight per 100 parts by weight of the film-forming polymer.

9. The recording material of claim 1 wherein the zinc compound is zinc oxide doped with said different metal.

10. The recording material of claim 9 wherein the doped zinc oxide contains 0.03 to 2.0% by weight, based on the weight of zinc oxide, of the different metal.

11. The recording material of claim 1 wherein the conductive recording layer further contains a fine powdery filler inert to the leuco dye.

12. The recording material of claim 16 wherein the amount of the fine powdery filler is 50 to 600 parts by weight per 100 parts by weight of the film-forming polymer.

13. The recording material of claim 1 wherein the conductive recording layer has a penetration electrical resistance of not more than $10^6$ ohms.

14. The recording material of claim 1 wherein the conductive recording layer has a thickness of 5 to 50 microns.

15. The recording material of claim 1 wherein the support has a surface specific electrical resistance of not more than $10^5$ ohms.

16. The recording material of claim 1 wherein the conductive recording layer further contains an electron donor compound inert to the leuco dye and selected from the group consisting of organic quaternary ammonium salts, amines, pyridinium salts, heterocyclic compounds, condensed ring aromatic hydrocarbons and polyhydric alcohols.

17. The recording material of claim 16 wherein the amount of the electron donor compound is 0.1 to 50 parts by weight per 100 parts by weight of the film-forming polymer.

* * * * *